(12) United States Patent
Chen

(10) Patent No.: US 9,133,901 B2
(45) Date of Patent: Sep. 15, 2015

(54) SPIRAL AIR PRESSURE SPRING

(75) Inventor: Ayu Chen, Zhejiang (CN)

(73) Assignee: XILINMEN FURNITURE CO., LTD., Yuecheng Shaoxing (CN)

( * ) Notice: Subject to any disclaimer, the term of this patent is extended or adjusted under 35 U.S.C. 154(b) by 58 days.

(21) Appl. No.: 13/980,281

(22) PCT Filed: Apr. 19, 2012

(86) PCT No.: PCT/CN2012/074383
§ 371 (c)(1),
(2), (4) Date: Jul. 17, 2013

(87) PCT Pub. No.: WO2013/127119
PCT Pub. Date: Sep. 6, 2013

(65) Prior Publication Data
US 2013/0334748 A1    Dec. 19, 2013

(30) Foreign Application Priority Data

Mar. 2, 2012   (CN) .......................... 2012 2 00750216

(51) Int. Cl.
*F16F 9/04*    (2006.01)
(52) U.S. Cl.
CPC .................................... *F16F 9/0418* (2013.01)
(58) Field of Classification Search
CPC .... F16F 1/371; F16F 9/0418; B60G 17/0272; B60G 2206/426; B60G 2500/20
USPC ........... 267/179, 180, 166, 177, 220, 33, 148, 267/153
See application file for complete search history.

(56) References Cited

U.S. PATENT DOCUMENTS

| 3,296,366 | A | * | 1/1967 | Bronikowski | ................ | 174/209 |
| 4,869,471 | A | * | 9/1989 | Schwarz et al. | ................ | 267/33 |
| 5,310,167 | A | * | 5/1994 | Noll, Jr. | ........................... | 267/33 |
| 5,685,525 | A | * | 11/1997 | Oguri et al. | ................... | 267/148 |
| 5,988,612 | A | * | 11/1999 | Bertelson | ..................... | 267/148 |

(Continued)

FOREIGN PATENT DOCUMENTS

| CH | 699780 A2 | 4/2010 |
| CN | 101109422 A | 1/2008 |

(Continued)

*Primary Examiner* — Melanie Torres Williams
(74) *Attorney, Agent, or Firm* — Global IP Services; Tianhua Gu

(57) ABSTRACT

A spiral air pressure spring designed by the invention solves the technical problems of complex structure and low compressive strength in the current gas springs. The spiral air pressure spring comprises a spring body, and is characterized in that the spring body is formed by an air column having a pressure air containing cavity, the air column is spiral, and at least one vent hole communicated with the containing cavity is arranged on the air column. The hardness of the spiral air pressure spring is adjusted by filling pressure air, the spiral air pressure spring is particularly large in deformation stroke and good in transverse and longitudinal ventilation, is used for manufacturing mattress, sofa, massage chair, cushion and the like, and is easy to remove moisture so that the influence on human body health is eliminated; the spiral air pressure spring is convenient in hardness adjustment and wide in one-way deformation range, meets the demands on various occasions and can be adjusted in real time to enhance the comfortable level; in addition, the spiral air pressure spring is convenient for coiled package to save the transportation cost, and can be unfolded by inflation when used by a user.

6 Claims, 2 Drawing Sheets

(56) References Cited

U.S. PATENT DOCUMENTS 6,454,251 B1 * 9/2002 Fish .............................. 267/166
6,481,702 B1 * 11/2002 Fader et al. ................... 267/220
6,733,023 B2 * 5/2004 Remmert et al. ...... 280/124.179

FOREIGN PATENT DOCUMENTS

| CN | 102588488 A | 7/2012 |
| DE | 10341167 A1 | 3/2005 |
| JP | 1183413 | 7/1989 |

* cited by examiner

SPIRAL AIR PRESSURE SPRING

TECHNICAL FIELD

The invention relates to the technical field of spring manufacturing, in particular to a spiral air pressure spring.

BACKGROUND

In terms of functionality, 'springs' can be classified in three categories including compression spring, torsion spring and tension spring, and common compression spring is formed by spirally coiling metal wires with strong elasticity, such as steel wires, and generates elasticity by means of their elastic deformation. Such a compression spring is fixed and nonadjustable in elasticity after being formed and still takes up a large space after being compressed, and satisfactory comfortable level cannot be imparted to all the application areas when it is used for spring mattress and the like. Gas spring has been designed, but it consists of a cylinder, a piston (push rod), an additional built-in spring and other parts, which leads to complex structure and high requirement on inter-part fitting; furthermore, the gas spring above is insufficient in deformation stroke and small in hardness adjustment range, and stills takes up a large space when not used.

SUMMARY OF THE INVENTION

The objective of the invention is to solve the shortcomings in the prior art discussed above and accordingly provides a spiral air pressure spring, which is adjustable in elasticity, long in deformation stroke and small in space after being compressed.

To achieve the objective above, the spiral air pressure spring designed by the invention comprises a spring body and is characterized in that, the spring body is formed by an air column having a pressure air containing cavity, the air column is spiral, and at least one vent hole communicated with the containing cavity is arranged on the air column. In the technical proposal defined by the invention, the air column is manufactured by simulating the spiral shape of a steel wire-made spring, thus, the spiral air pressure spring not only has the advantages of large deformation and wide hardness adjustment range, but can also be adjusted in its hardness (elasticity) in real-time by means of inflation or deflation so as to improve the comfortable level and the applicable scope; in addition, the spiral air pressure spring is simple in structure and convenient to process; after the pressure air in the air column is eliminated and the spiral air pressure spring is compressed, the spring takes up a small space and can be coiled to facilitate package, storage and transportation.

As further perfection and completion for the structure discussed above, the invention also includes the following additional technical features and random combinations of these features:
the air column is formed by a strip-shaped cylinder spirally, and the air column is longitudinally arranged and provided with transverse and longitudinal air passages, so the spring is convenient to process and good in ventilation as well as low in possibility of moisture deposition to avoid the influence of gathered moisture on human body health when spring is used for mattress, sofa, massage and cushion.

The diameters of the upper and lower air column mouths of the air column are smaller than the diameters of the spiral mouths in the middle, and the spiral mouths in the middle are consistent in diameter, the upper and lower air column mouths are used for creating independent support and reduce mutual pulling deformation between the air columns, as a result, mutual interference is small, recess formation is avoided, and better adherence to human body profile is achieved so as to enhance the comfortable level; a space for air pipe installation can be reserved in the middle corrugated section and is also favorable for transverse flowing of air.

Connection planes are arranged on the outer sidewalls of the air column, contributing to connection among the air columns.

Hard rings are lined at the upper and lower mouths of the air column in order to prevent the damage of uneven stress caused by single-side pressure bias and to improves the integral compressive strength of the air pressure spring.

The spring body is sleeved with an outer cover, and in this proposal, the outer cover may be a bag made of fiber fabric and can be deformed along with the deformation of the spring body, thus facilitating connection between the adjacent air pressure springs and preventing adhesion and interference between the adjacent sidewalls.

At least one layer of the sidewall of the air column is formed by a macromolecular organic material or by laminating the macromolecular organic material and a fabric, and laminating the macromolecular organic material and the fabric means filling of the macromolecular organic material in the pores of the fabric or covering of the macromolecular organic material at one side of the fabric. The macromolecular organic material herein includes rubber, thermoplastic polyurethane (TPU) and/or nylon, the effect of sealing pressure air can be achieved by adopting macromolecular materials like rubber, besides, leak repair can be implemented via a leak repair agent in order to improve softness and sealing property; the fabric plays a role of shaping, so that the air pressure spring is free from excessive extended deformation subsequent to filling of pressure air, and sufficient strength is imparted to cavity wall.

The spring body has a height of 4-20 cm, if the spring body is too high, deformation stroke of the air column will be too long, leading to instability, and if the spring body is too low, the comfortable level will be reduced due to relatively high hardness; the spring body has a diameter of 4-8.5 cm, if the diameter is too large, surface materials laid on the air column will be immersed from the hollow part to create a pit, and if the diameter is too small, the bottom surface is narrowed and the spring body is unstable and accordingly liable to swing under pressure.

A spiral air pressure spring obtained by the invention overcomes the defects of great corrosion possibility and nonadjustable elasticity in metal spring and also overcomes the defects of complex structure, poor ventilation, insufficient deformation stroke and low compressive strength in piston (push rod) type gas spring; the hardness of the spiral air pressure spring is adjusted by filling pressure air, the spiral air pressure spring is particularly large in deformation stroke and good in transverse and longitudinal ventilation, is used for manufacturing mattress, sofa, massage chair, cushion and the like, and is easy to remove moisture so that the influence on human body health is eliminated; the spiral air pressure spring is convenient in hardness adjustment and wide in one-way deformation range, meets the demands on various occasions and can be adjusted in real time to enhance the comfortable level; in addition, the spiral air pressure spring is convenient for coiled package to save the transportation cost, and can be unfolded by inflation when used by a user.

Figure 1:
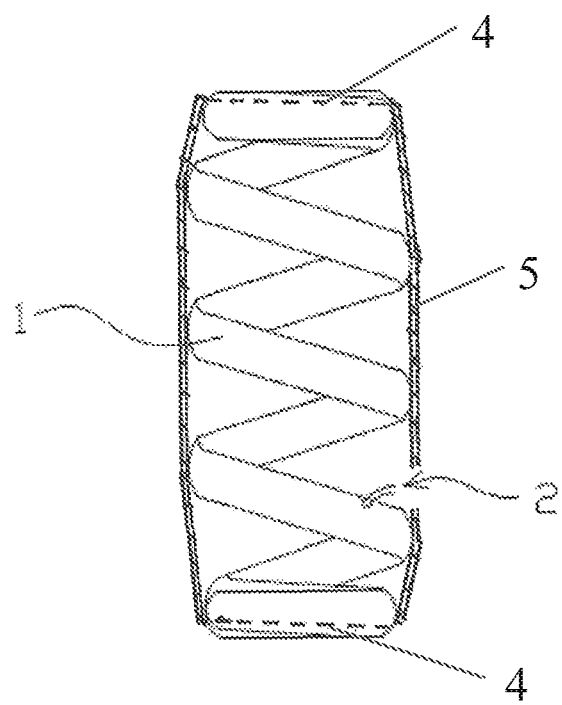
FIG. 1 is a structure diagram of the invention.

In the drawings: 1—air column, 2—vent hole and 3—connection plane.

DETAILED DESCRIPTION OF THE EMBODIMENTS

Further description is made below to the invention by the embodiments with reference to the drawings.

Embodiment 1

Figure 2:
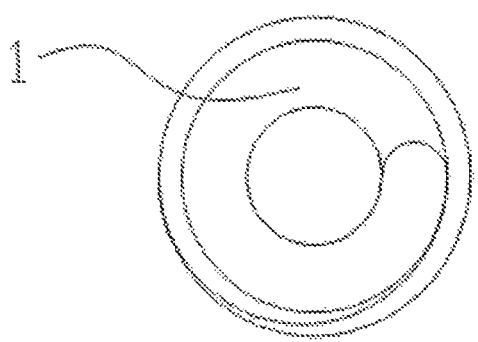
FIG. 2 is a top view of FIG. 1.

As shown in FIG. 1 and FIG. 2, a spiral air pressure spring described in the invention comprises a spring body, the spring body is formed by an air column 1 having a pressure air containing cavity, the air column 1 is spiral, one vent hole 2 communicated with the containing cavity is arranged on the air column 1, both inflation and deflation are completed by the vent hole 2, and there may also be two vent holes 2, for inflation and deflation respectively. The air column 1 is formed by a strip-shaped cylinder spirally, and the air column 1 is longitudinally arranged and provided with transverse and longitudinal air passages. The diameters of the upper and lower mouths of the air column 1 are smaller than the diameters of the spiral mouths in the middle, and the spiral mouths in the middle are consistent in diameter. Hard rings 4 are lined at the upper and lower mouths of the air column 1, the spring body is sleeved with an outer cover 5. At least one layer of the sidewall of the air column 1 is formed by a macromolecular organic material or by laminating the macromolecular organic material and a fabric, and laminating the macromolecular organic material and the fabric means filling of the macromolecular organic material in the pores of the fabric or covering of the macromolecular organic material at one side of the fabric. The spring body has a height of 4-20 cm and a diameter of 4-8.5 cm.

Figure 3:
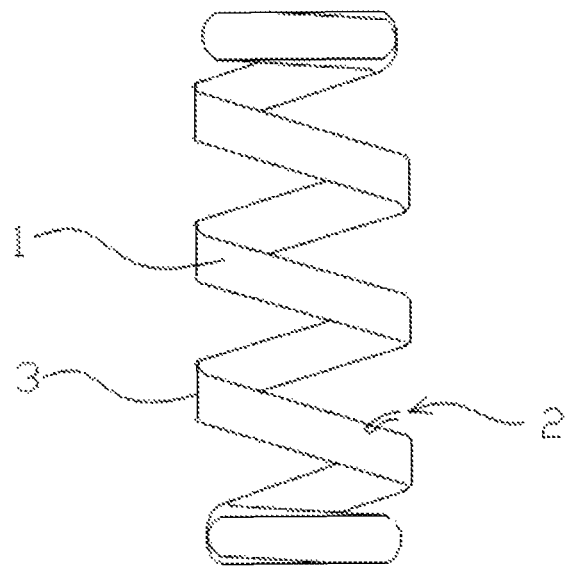
FIG. 3 is another structure diagram of the invention.
Figure 4:
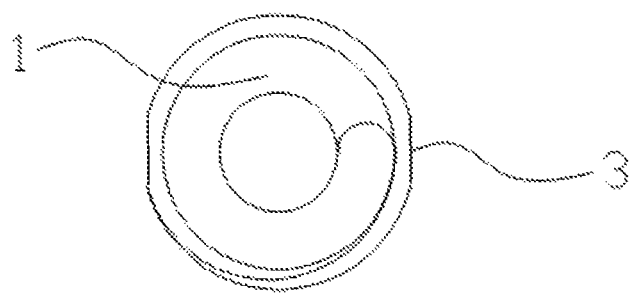
FIG. 4 is a top view of FIG. 3.

To facilitate connection between the air columns 1, connection planes 3 are arranged on the outer sidewalls of the air column 1, as shown in FIG. 3 and FIG. 4.

Discussed above is merely the preferred embodiments of the invention that are used for understanding the structure, functionality and effect of the invention and are not intended to limit the invention. There may be a variety of modifications and variations made to the invention in the embodiments discussed above. Any modifications, equivalent substitutions and improvements made within the spirit and principle of the invention shall fall within the scope of the invention.

The invention claimed is:

1. A spiral air pressure spring comprising a spring body, characterized in that, the spring body is formed by an air column having a pressure air containing cavity, the air column is spiral, and at least one vent hole communicated with the containing cavity is arranged on the air column wherein the diameters of the upper and lower mouths of the air column are smaller than the diameters of the spiral mouths in the middle, and the spiral mouths in the middle are consistent in diameter, and wherein connection planes are arranged on the outer sidewalls of the air column.

2. The spiral air pressure spring according to claim 1, wherein the air column is formed by a strip-shaped cylinder spirally, and the air column is longitudinally arranged and provided with transverse and longitudinal air passages.

3. The spiral air pressure spring according to claim 1, wherein hard rings are lined at the upper and lower mouths of the air column.

4. The spiral air pressure spring according to claim 3, wherein the spring body is sleeved with an outer cover.

5. The spiral air pressure spring according to claim 1, wherein at least one layer of the sidewall of the air column is formed by a macromolecular organic material or by laminating the macromolecular organic material and a fabric, and laminating the macromolecular organic material and the fabric means filling of the macromolecular organic material in the pores of the fabric or covering of the macromolecular organic material at one side of the fabric.

6. The spiral air pressure spring according to claim 1, wherein the spring body has a height of 4-20 cm and a diameter of 4-8.5 cm.

* * * * *